(12) United States Patent
Finger

(10) Patent No.: US 8,865,036 B2
(45) Date of Patent: Oct. 21, 2014

(54) STRETCH-BLOWING METHOD AND MACHINE

(75) Inventor: Dieter Finger, Neutraubling (DE)

(73) Assignee: Krones AG, Neutraubling (DE)

( * ) Notice: Subject to any disclaimer, the term of this patent is extended or adjusted under 35 U.S.C. 154(b) by 368 days.

(21) Appl. No.: 13/309,947

(22) Filed: Dec. 2, 2011

(65) Prior Publication Data

US 2012/0139169 A1 Jun. 7, 2012

(30) Foreign Application Priority Data

Dec. 3, 2010 (DE) .......................... 10 2010 062 424

(51) Int. Cl.
*B29C 49/78* (2006.01)
*B29C 49/12* (2006.01)
(52) U.S. Cl.
CPC ........... *B29C 49/12* (2013.01); *B29C 2049/129* (2013.01); *B29C 49/78* (2013.01)
USPC ........................................ 264/40.5; 264/532
(58) Field of Classification Search
None
See application file for complete search history.

(56) References Cited

U.S. PATENT DOCUMENTS 4,177,239 A 12/1979 Gittner et al.
6,576,171 B1 6/2003 Devenoges

FOREIGN PATENT DOCUMENTS

| DE | 2717365 A1 | 10/1978 |
|---|---|---|
| DE | 102007008023 A1 | 8/2008 |
| DE | 102007015105 A1 | 10/2008 |
| EP | 1066149 A1 | 1/2001 |
| WO | WO-2008/098565 A2 | 8/2008 |

OTHER PUBLICATIONS

Search Report for DE102010062424.1 dated Jul. 26, 2011.

*Primary Examiner* — Monica Huson
(74) *Attorney, Agent, or Firm* — Marshall, Gerstein & Borun LLP

(57) ABSTRACT

A method for stretch-blowing containers of preforms in a blow-molding station of a blow-molding machine, where a stretching bar is adjusted during a stretching process via an electric servomotor by taking along the preform bottom until it contacts a mold cavity bottom of a blow mold, and where in the final phase or at the end or after termination of the stretching process the force transmitted by the servomotor to the stretching bar is reduced in a controlled manner by a maximum force. A stretch-blowing machine, including an electronic programmable control unit having an input section for programming a fixed or a variable reduction of the force the servomotor transmitted in a final phase or upon termination or after termination of each stretching process to the stretching bar with regard to a maximum force and a fixed or a variable period of time for the force reduction and/or a fixed or a variable force reduction waiting time.

13 Claims, 3 Drawing Sheets

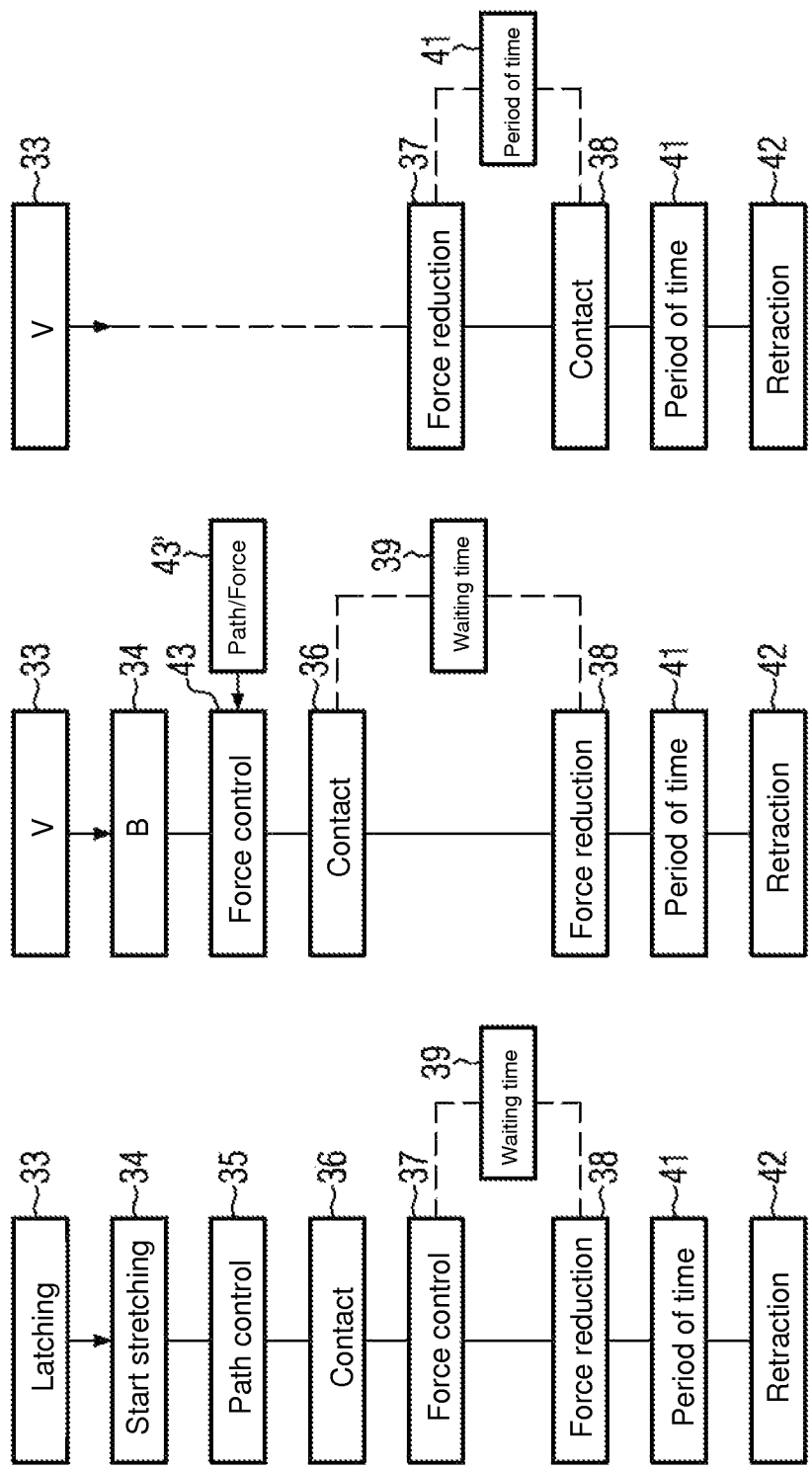

STRETCH-BLOWING METHOD AND MACHINE

CROSS-REFERENCE TO RELATED APPLICATION

The present application claims the benefit of priority of German Application No. 102010062424.1, filed Dec. 3, 2010. The entire text of the priority application is incorporated herein by reference in its entirety.

FIELD OF THE DISCLOSURE

The disclosure relates to a method and to a stretch blowing machine for stretch-blowing of containers from performs.

BACKGROUND

In a stretch blowing machine as known from EP 1 066 149 A, each stretching process is controlled by means of an electric servomotor, e.g. a linear motor, via the electronic programmable control unit. In doing so, a process is conducted in which the force the servomotor has transmitted to the stretching rod is variable, e.g. in order to avoid damages of the bottom of the preform, namely in a control loop, the force automatically resulting from the motor current and a sensor or force meter position. The control unit controls predetermined force curves. Although the force the servomotor transmitted to the stretching rod is varied, it is continuously being increased until the stretching process has been terminated so that the force will have reached a maximum value by then.

In a stretch blowing machine as known from WO 2008/098565 A, a rigid stretching system is provided at the stretching rod, an electric servomotor, e.g. a linear motor and a mechanical coupling. The control unit comprises a controller for the force-controlled stretching of the preforms. The force the servomotor transmitted to the stretching rod is measured by detecting the motor current and is varied over the stretching distance. The stretching rod position is detected by sensors provided at the motor, respectively. Predetermined force/distance or force/time profiles are being executed by means of said control unit.

As soon as the stretching process has been terminated, i.e. as soon as the preform has been stretched to full length, the lower end of the stretching rod can press into the bottom of the preform so as to avoid that the bottom drifts away to the side (off-center protection) which might otherwise result in an uneven thickness of the material over the circumference of the container. Such so-called over-pressing can be easily controlled in pneumatic stretching bar drive systems, as the pneumatic cylinder operates in an abutting manner and a pneumatic drive system is not rigid. In contrast thereto, stretching bar drive systems having an electric servomotor are rigid systems, with the imminent risk for each stretching operating that the servomotor tries to move towards a desired position at maximum force, yet without being able to reach same so that thermal overload will occur.

SUMMARY OF THE DISCLOSURE

The disclosure is based on the object to provide a method of the kind as mentioned above and a stretch-blowing machine suitable to perform said method by which the danger of thermal overload of the electric servomotor can either be minimized or excluded. Further, it is also part of the object, e.g. in case of critical container shapes, to realize an off-center protection despite minimizing or excluding thermal overload of the electric servomotor.

According to the method, despite the rigid drive system with electric servomotor, the force the servomotor transmitted to the stretching bar during force control is reduced in a targeted manner at the end of the stretching process so that there is either no overpressure at all or an overpressure of the preform bottom which only just guarantees the off-center protection. The danger of thermal overload of the servomotor, however, has been minimized or excluded, as the servomotor does not try to approach a desired position which is impossible to reach at maximum force but at the reduced force and preferably over a limited period of time.

In the stretch-blowing machine, the sequence or progress of each stretching process can be determined via the correspondingly conceptualized input and output sections either by means of fixed values or in a variable manner so that in case of force control of the stretching bar adjustment, the force the servomotor has transmitted to the stretching bar is reduced in a predetermined manner at the end of the stretching process, preferably after or over a predetermined period of time, so as to restrict the thermal load of the servomotor and its servo converter to an admissible value by which the danger of thermal overload can at least be minimized or entirely be excluded.

The transmitted force is reduced in a controlled manner with regard to a maximum force. Such maximum force can either be the maximum nominal force of the servomotor or a force below the maximum nominal force, however, such force normally being larger than the residual force acting at the stretching bar after force reduction.

In an appropriate variant of the method, the force during the end phase of the stretching process is reduced a given period of time before the preform bottom contacts the mold cavity bottom and is, at least over such period of time and until contact takes place, controlled in such a reduced manner. Preferably, such reduced force can still be maintained beyond the contact over a given period of time until the shaping or molding process of the container has either been terminated or mostly terminated and before the stretching bar will be retracted.

In another variant of the method, the force at the end of the stretching process is reduced in a relatively precise manner as soon as contact takes place and then maintained reduced over a given period of time. Until contact takes place, the stretching bar is driven with a high force so as to ensure an optimally short cycle time. However, the force reduction will not be reduced until the entire stretching process has been terminated.

In yet another variant of the method, the force will even not be reduced until the stretching process has been terminated and not until a given waiting time after the contact has passed and will then be maintained reduced over a given or predetermined period of time. The waiting time is set such that there will be no thermal overload of the servomotor or the servo converter.

In an appropriate, simply programming variant of the method, the force is reduced by a fixed value, e.g. to a fixed percentage of the maximum force.

In still another variant of the method, the force is reduced by a variable value which has been adapted to the corresponding process conditions and/or material parameters and/or container shapes, or the like.

Furthermore, it is advisable to set the period of time and/or the waiting time either in a fixed or in an individually variable manner.

In another variant of the method, instead of the period of time and/or the waiting time, corresponding rotary angles of a blow wheel having the shape of the blow mold and being drivable in a rotatable manner are used for the force control, the rotary angle of the blow wheel being captured and transmitted to the control unit via corresponding sensors or meters.

Expediently, the force is reduced to a residual force controlled with regard to a thermal overload protection of at least the servomotor. Alternatively or additionally, the period of time or waiting time is also set with regard to thermal overload protection. To this end, it can be useful to have the force just being reduced to a residual force that is controlled with regard to an off-center protection of the preform bottom and/or to have the time period or waiting time being set correspondingly. For instance, in case of a higher residual force the time period will be set shorter, and vice versa in case of a lower residual force the time period will be set longer.

Moreover, the force reduction may be calculated and controlled automatically by taking the current servomotor load into account, e.g. by means of a routine of the control unit or of at least one servo converter, e.g. by tracing a tendency or trend towards a thermal critical load and by acting against same by means of force reduction before the critical load has been reached. In such a case, the force can also be reduced by a fixed value, or can be controlled variably, e.g. irrespective of the development of the tendency (creeping or progressive). The same applies to a then set waiting time and/or period of time.

Further it may be useful to have at least the most part of the stretching process force-controlled, i.e. at least in its final phase.

Alternatively, the stretching process may be path-controlled during an initial phase so as to have a short cycle time and may be force-controlled not until the final phase or at the end of the stretching process, wherein, after having switched from the path control to the force control, a fixed or variable waiting time may first be taken into consideration until the force has is being reduced.

It is generally advantageous to have the stretching process controlled at different speeds during different stretching phases, thus providing for more flexibility in controlling the stretching process and for high container quality.

BRIEF DESCRIPTION OF THE DRAWINGS

Embodiments of the subject matter of the disclosure will be explained by means of the drawings, wherein:

FIG. 5 is a flow chart showing the control of a stretching process,

FIG. 6 is a flow chart relating to another stretching process, and

FIG. 7 is a part of a flow chart relating to still another stretching process.

DETAILED DESCRIPTION OF THE PREFERRED EMBODIMENT

Figure 1:
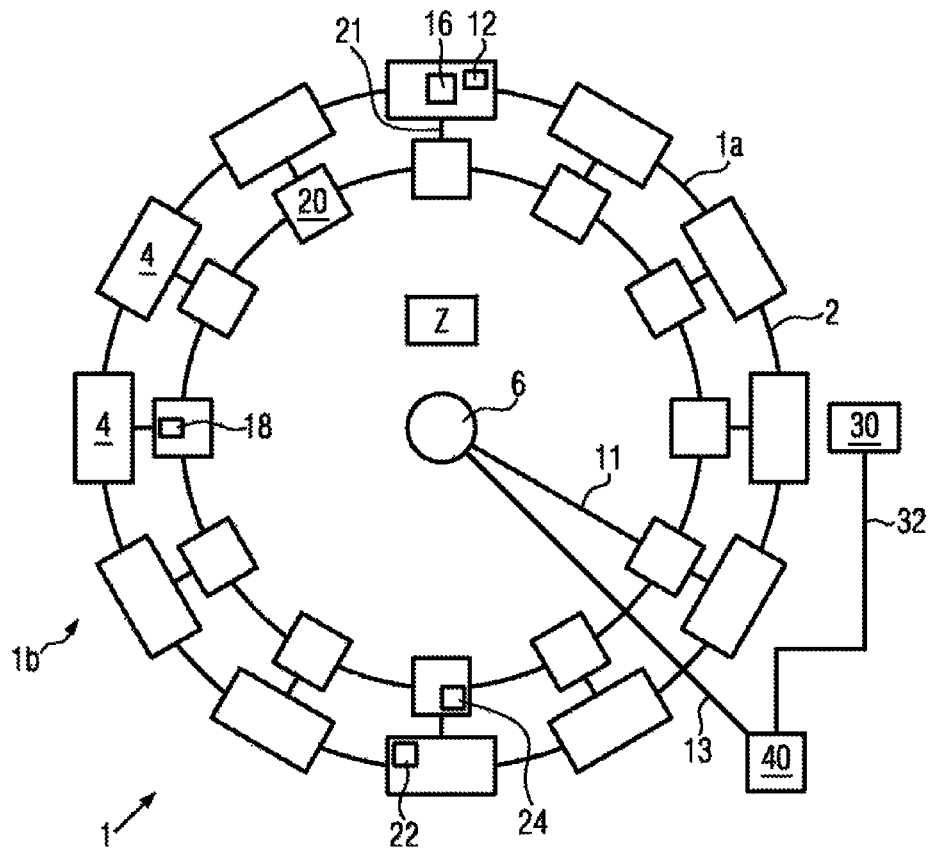
FIG. 1 is a schematic view of a stretch-blowing machine (rotary machine)

FIG. 1 shows a stretch-blowing machine 1 for stretch-blowing containers, particularly bottles, of preforms. In this case, stretch-blowing machine 1 is a rotary machine comprising a blow wheel 2 carrying, at its backside, blow-molding stations 4 and representing a part 1a which is rotating in relation to a stationary part 1b. The disclosed concept can, however, also be applied without any restrictions to stretch-blowing machines having the blow-molding stations or one blow-molding station arranged in a stationary manner (not shown).

In FIG. 1, an electronic programmable control unit 20 is arranged on blow wheel 2 for at least one blow-molding station 4. Energy is supplied to each control unit 20 via e.g. connecting lines 11 and a rotary union 6, e.g. a slip-ring arrangement and/or media union, in the center of blow wheel 2. Each of said blow-molding stations 4 comprises a stretching bar drive system A having an electric servomotor 16 and a servo converter (not shown) as well as a valve section 12, if necessary with a plurality of valves for controlling the supply of blower air during the stretch-blowing process. Further, at least one sensor 22 may communicate as a meter with the corresponding control unit 20. Where appropriate, an electronic timer 24 is provided e.g. for initiating a work cycle in dependency of a start signal or for having times being executed which were set for designated process phases. Further, at least one sensor 30 can be provided as a position sensor or meter for detecting an angular position while blow wheel 2 is being rotating. These electronic components each are connected, for example, to the respective control unit 20 or to a preferably programmable, electronic and central control unit 40 provided in the stationary part 1b and communicating e.g. with a sensor 30 via an adumbrated connection 32. A communication line 13 may be provided for transmitting a start signal to the respective control unit 20. A storage and/or input and/or display section 18 can be provided in at least one control unit 20 (then centrally for all control units) or in each of the control units 20 for saving, reading, communicating, data, etc. Each control unit 20 communicates via a connection 21 with blow-molding station 4 or stretching bar drive system A or servomotor 16 for electrical stretching. The input and/or display section 18 might alternatively or additionally be assigned to the central control unit 40.

The corresponding input and/or display section 18 may comprise, e.g. at control unit 40 in stationary part 1b, at least one section 18a, 18b, e.g. keyboard or a touch screen for entering or setting e.g. a percentage stretching force reduction at a given time during a stretching process or starting from a given position of a stretching bar 15 and a time period and/or waiting time assigned to the stretching bar reduction, as will be explained later with regard to FIGS. 5 to 7.

The stretching force reduction (e.g. the dimension thereof or the residual force) and/or the time period or waiting time may alternatively and/or additionally be automatically detected and taken into consideration by the control units 20 or 40 or by a servo converter provided therein. It is particularly the servo converter which frequently internally simulates or copies servomotor models which are fed with operating parameters of the servomotor 16 such as motor current, temperature, etc. so as to allow for the calculation of the current percentage motor load. If during such a calculation it is detected that a set thermal overload has been exceeded, the servo converter will switch off for safety reasons. The routine of the servo converter or control unit 20, 40 can be used favorably for tracing a tendency to reach the thermal critical load and for reducing the stretching force correspondingly in good time before such thermal critical load has been reached and, if necessary, for setting the time period and/or waiting time corresponding to a thermal overload protection.

The electronic servomotor 16 might be combined (not shown) with an energy or force storing means or a pneumatic cylinder which assists or intervenes into each stretching process and, if required, is also controlled via control unit 20.

Control unit 20 can be used universally in different stretch-blowing machines and is provided, if required, with hardware and software technologies for optionally controlling the respective blow-mold station 4 irrespective of the kind of stretching bar drive system A. Further, control unit 20 can also control the pressurization during the stretch-blowing process and/or the required settings or adjustments of a blast nozzle and of other components dealing with the blast or blow pressure. Blow wheel 2 may further be provided with a central lubricating device Z supplying mechanical components provided at blow wheel 2 with lubricant, e.g. in a dosing manner.

Figure 4:
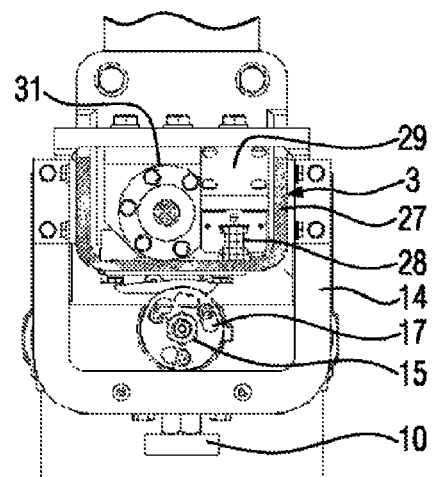
FIG. 4 is a cross-sectional view of the blow-molding station.
Figures 2, 3:
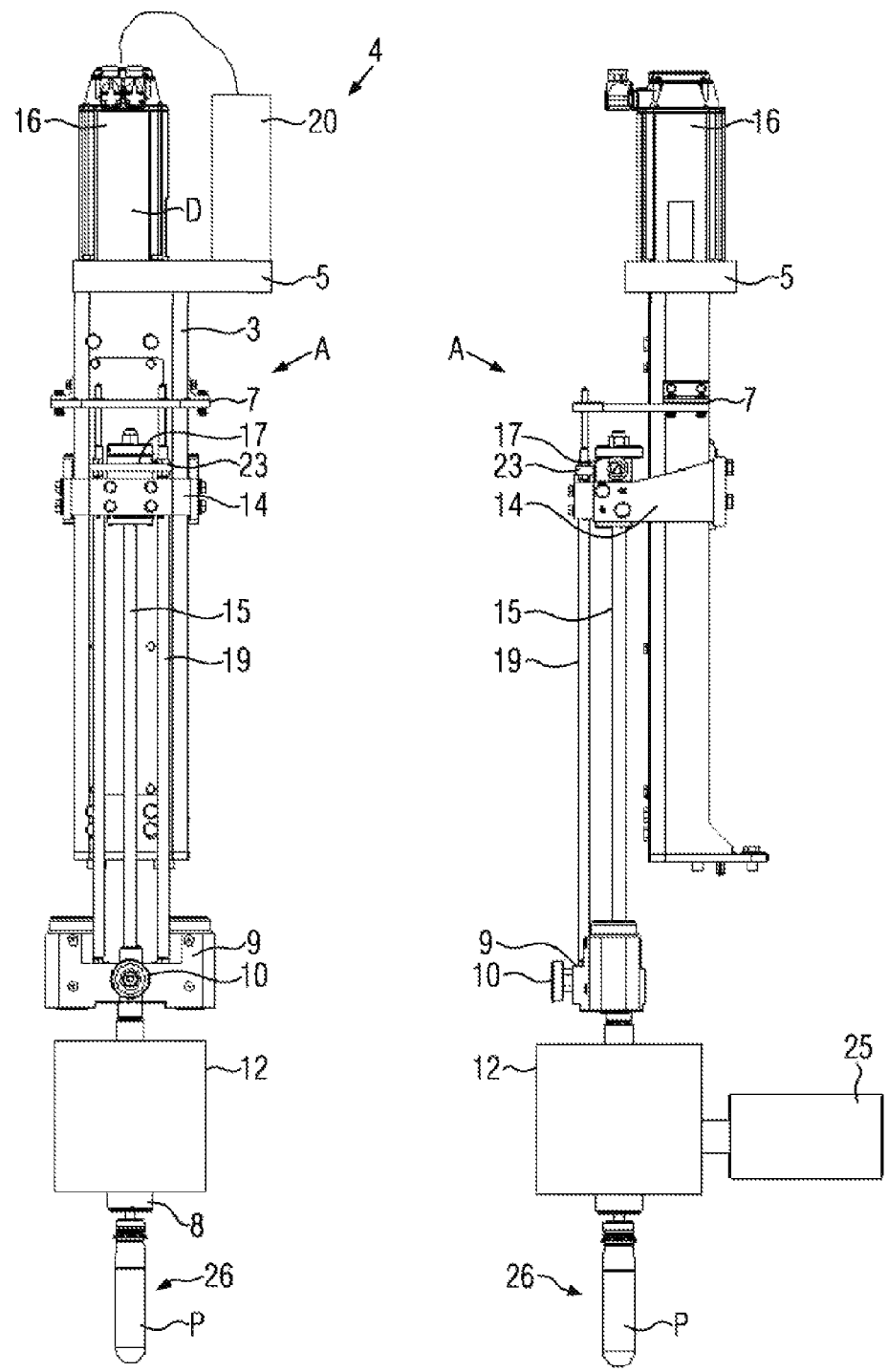
FIG. 2 is a front view of a blow-molding station.
FIG. 3 is a side view of the blow-molding station according to FIG. 2.

FIGS. 2 to 4 are views, assigned to one another of an embodiment of a blow-molding station 4 comprising a stretching bar drive system A, with only main components being shown.

A bearing block 3 mounted to blow wheel 2 above a divided blow mold 26 (not shown in detail) carries electric servomotor 16 here being designed as a rotary motor, and control unit 20. Servomotor 16 and control unit 20 can be installed via a cooling member 5 at the top of bearing block 3, a considerable part thereof being in the form of a U-profile (FIG. 4). Bearing block 3 can be provided with a stopper 7 for a stretch slide 14 coupled to a stretching bar 15. Preferably, stopper 7 is adjustable and/or spring-cushioned. Stretching bar 15 is fixed in stretch slide 14 via a releasable clutch 17 and extends parallel to bearing block 3 downwards until it reaches blow mold 26, at the position thereof a preform P being shown of which a container with the shape of the mold cavity of blow mold 26 will be formed by superimposing a stretching process and a blowing or blasting process. Stretching bar 15 penetrates a movably guided blow slide 9 to which is connected a blast nozzle 8 which can be lifted in relation to blow mold 26 and can be lowered, e.g. to the mouth of an inserted preform P, until it fits close.

Blow mold 26 includes (not shown) e.g. two mold halves and a bottom shape defining a mold cavity bottom FB (FIG. 4), with at least the mold halves being arranged in carriers movable by means of a (not shown) mechanism to open and close blow mold 26 and to lock the same in closed condition and after insertion of preform P.

As soon as the locking phase has been terminated, for instance, blast nozzle 8 will be fit to preform mouth B before pressurization is done via valve section 12, e.g. in order to carry out a pre-blow phase at a lower pressure level and thereafter a finish-blow phase at a high pressure level, superimposed by the stretching process by means of stretching bar 15 which is being pushed or inserted into blow mold 26 until, at the end of such stretching process, preform bottom B is at least brought into contact with mold cavity bottom FB or even exposed to overpressure. Due to such overpressure, there is off-center protection against any drifting of preform bottom B to the sides during the stretch-blowing process.

At least one driver bar 19 extends from stretch slide 14 to blow slide 9. In a driving clutch 23, driver bar 19 can be coupled to stretch slide 14 in the return stroke direction thereof of stretching bar 15, e.g. in order to lift blow slide 9 or to stop stretch slide 14 in relation to the thus mechanically locked blow slide.

Servomotor 16 is connected to stretch slide 14 via a threaded spindle 31 which is arranged inside of U-profile 27 and may also be supported therein. Stretch slide 14 encompasses U-profile 27 and extends together with a coupling 29 into the inside of U-profile 27 and also into a linear guidance 28 arranged therein. Stretching bar 15 can be replaced from stretch slide 14 by means of releasable clutch 17.

FIG. 4 adumbrates a lifting element 10 (also see FIGS. 2 and 3) provided at blow slide 9. Such lifting element 10 is e.g. a driver roller cooperating with a (not shown) guard curve for lifting blow slide 9, e.g. in order to ventilate the finished container in blow mold 26 in case an exhaust valve to a sound damper 25 provided at valve section 12 should not work properly.

The movement of the blow slide is controlled via a (not shown) curve control or, alternatively, via a servomotor, e.g. in time- or path-dependent assignment to the mechanism, by which the locking phase of blow mold 26 is controlled.

During the stretching process, control unit 20 (or control unit 40) controls an exactly predetermined motion sequence of the stretching bar adjustment so that the free end of stretching bar 15 penetrating valve section 12 approaches and travels through given positions, e.g. a first position in which the free end of stretching bar 15 approaches the preform bottom B of the still unstretched preform P up to about 1.0 mm, or already contacts preform bottom B, or an even deeper position in which preform P has been pre-stretched to some extent. Thereafter, stretching bar 15 is moved up to a final position at mold cavity bottom FB, yet without getting into contact with said cavity bottom FB. Stretching bar 15 may be adjusted in a path- and/or force-controlled manner wherein it is even possible to switch during a work cycle from a path control to a force control, and vice versa. The speed of the stretching bar can also be changed without reversal of motion during a stretching process, e.g. at least twice, before stretching bar 15 retracts or moves back after or slightly before shaping of the container has been terminated.

Alternatively, servomotor 16 may be a linear motor, preferably a linear motor of tubular construction or of a flat construction, and may form, together with its rotor, a direct drive for stretching bar 15 (not shown). Further, an energy storing means could have been assigned to electric servomotor 16, e.g. a spring or a pneumatic cylinder, for assisting servomotor 16 and/or generating predetermined force sequences, or for receiving or compensating forces subjecting stretching bar 15 in backwards direction and originating e.g. from the pressure in the containers already produced with the blow mold 26 not yet being vented.

Servomotor 16 as a rotating motor D might transmit the rotating movement via a cable holder chain or a toothed belt, e.g. in an endless loop, in order to stretch slide 17 and stretching bar 15 (not shown).

During electric stretching of preform P, the stretching process is controlled via servomotor 16 in such a manner that stretching bar 15 is inserted, e.g. at the latest with the beginning of the locking phase or during the locking phase of blow mold 26, if necessary even before the beginning of the locking phase of blow mold 26, e.g. when a (not shown) transfer arm carrying the preform P moves synchronously and along the same moving path as not yet closed blow mold 26. Stretching bar 15 is first displaced up to about 1.0 mm towards preform bottom B or even up to contact therewith before blast nozzle 8 is set on the mouth of preform P in a sealed manner and the pre-blowing phase is being initiated. Until then, stretching bar 15 can even be further inserted, i.e. may already have started with pre-stretching preform P before blast nozzle 8 is set on the mouth. Thereafter, when still in the pre-stretching phase in which the container form will be readily blown up to a prevailing percentage, stretching bar 15 will be further displaced in the direction towards and until it almost reaches mold cavity bottom FB such that then the lower side of preform bottom B at least contacts mold cavity bottom FB. In the following or superimposed final blow-molding phase stretching bar 15 further exerts force at a higher blow pressure and even executes more pressure or overpressure on preform bottom B after working. The stretching bar displacements are controlled by control unit 20 either in path-controlled or force-controlled manner and, if necessary, in correlation with the blow pressure control, wherein, as mentioned, it can be switched between path control and force control during the same stretching process, and different speeds can be controlled in different stretching phases.

The positions of stretching bar 15 during the stretching process are given by control unit 20, as well as the speed which conveniently can be changed twice. Any corresponding pre-settings are predetermined either by means of a preceding calibration process for gathering parameter values for control unit 20 and/or by means of entering such parameter values, of course, depending on the respective type of preform and/or container. The corresponding target positions of stretching bar 15 or the transmitted target forces e.g. are obtained for the predetermined stretching phases by control unit 20 via correspondingly read signals and/or current values of servomotor 16, as the stretching bar drive system A is rigid.

At least one frequency converter or servo converter has been assigned to servomotor 16 for supplying servomotor 16 with supply voltage (e.g. about 600 to 900 V).

According to the disclosure, the force servomotor 16 transmitted to stretching bar 15 is reduced in each stretching process with regard to a maximum force (the maximum nominal force or a predetermined maximum force of servomotor 16) in assignment to the final phase of the stretching process, a time period or a waiting time expediently also being taken into consideration and that mainly as thermal overload protection for servomotor 16 and its servo converter. The force reduction is controlled upon need such that more pressure or overpressure of preform bottom B is either done or not as off-center protection. This will be explained by means of FIGS. 5 to 7.

FIG. 5 as a flow chart illustrates the sequence of a stretching process with initially running path control switching to force control. At 33, the locking phase of blow mold 26 has been terminated. At 34, the stretching process starts, as mentioned, with a path control 35 until preform body B contacts mold cavity bottom FB at 36. In this phase of the stretching process it is switched to a force control at 37 and thereafter a force reduction is applied or set-up at 38, i.e. the force the servomotor 16 transmitted to stretching bar 15 will be reduced with regard to the maximum force to a lower residual force. As a dotted alternative in FIG. 5, a predetermined waiting time can be set at 39 between switching to the force control at 37 and applying the force reduction at 38, said waiting time being dimensioned such that no thermal overload of servomotor 16 can occur during that time. After having applied the force reduction at 38, such force reduction or such residual force will be maintained over a predetermined period of time 41, e.g. until shortly before the shaping of the container has been terminated, before stretching bar 15 starts retracting or moving back again at 42.

According to the variant of the method as shown in FIG. 6, stretching bar 15 is adjusted from the beginning of the stretching process at 34 by means of the force control at 43 until preform bottom B and mold cavity bottom FB contact each other at 36. As soon as such contact has been detected (by means of force measuring and/or position settings), the force reduction is applied at 38 which will then be maintained over the given period of time at 41 until stretching bar 15 starts with its backward movement at 42.

As an alternative according to FIG. 6, the force control cannot be active already from the beginning 34 of the stretching process, but switching from path control to force control is only possible later until contact occurs at 36, as adumbrated at 43'. As another alternative, a waiting time can be set at 39 between the contact at 36 and the force reduction at 38.

In the method variant in FIG. 7, the force reduction is already applied at 38 during the sequence of the stretching process (with force control) before there is contact at 36 (in the ideal case shortly before such contact). Starting from contact 36 the force reduction 38 is maintained over the given period of time 41 before stretching bar 15 starts with its backward movement at 42. As dotted alternative in FIG. 7, a predetermined period of time can be set at 41 between the force reduction at 38 and the contact at 36, over which the reduced residual force is effective.

The method variants according to FIGS. 5, 6, 7 should not be considered as limiting but can be combined with one another. The force reduction can be applied with a fixed force value, or the force value of the force reduction is varied individually. Similarly, the waiting time and/or time period may correspond to a first time or may be varied upon need. Thereafter, the waiting time and/or time period may alternatively be taken into consideration as a rotary angle region of an entire revolution of the blow wheel so that the signals of e.g. timer 24 in FIG. 1 and/or of sensor 30 can be processed. The residual force can of course also be varied as required as soon as force reduction has taken place.

The invention claimed is:

1. A method for stretch-blowing containers of preforms in a blow-molding station of a blow-molding machine, wherein at least one blow mold defines a mold cavity, comprising:
   providing in the blow-molding station a blast nozzle and a stretching bar which can be adjusted via an electric servomotor
   controlling one of at least the speed, the force, the distance, and a combination thereof of the stretching bar adjustment with an electronic control unit via the servomotor for each stretching process,
   adjusting the stretching bar during the stretching process by pressurizing the preform from the blast nozzle while taking along the preform bottom to the maximum of contact of the bottom with the mold cavity bottom, and
   reducing the force the servomotor transmits to the stretching bar in a controlled manner with regard to a maximum force one of in a final phase, at the end, or after termination of the stretching process, wherein the force is controlled for a period a corresponding to a rotary angle region of an entire revolution of a blow wheel drivable in a rotatable manner and including the blow mold.

2. The method according to claim 1, wherein the force in the final phase of the stretching process is reduced a predetermined period of time prior to the contact and is controlled in a reduced manner over the period of time up to the contact.

3. The method according to claim 1, wherein after the stretching process has been terminated the force is not reduced until a predetermined waiting time has elapsed and is then controlled over a predetermined period of time in such a reduced manner.

4. The method according to claim 1, wherein the force is reduced by a fixed value.

5. The method according to claim 1, wherein the force is reduced by a variable value.

6. The method according to claim 1, wherein one of the period of time, the waiting time, and a combination thereof is controlled in one of a fixed and a variable manner.

7. The method according to claim 1, wherein the stretching process is path-controlled during an initial phase and is force-controlled not before the final phase or after termination of the stretching process.

8. The method according to claim 1, wherein the stretching process is controlled in different stretching phases by different speeds.

9. The method according to claim 7, and wherein, after having switched to the force control a fixed or variable waiting time is maintained until force reduction takes place.

10. A method for stretch-blowing containers of preforms in a blow-molding station of a blow-molding machine, wherein at least one blow mold defines a mold cavity, comprising:
- providing in the blow-molding station a blast nozzle and a stretching bar which can be adjusted via an electric servomotor
- controlling one of at least the speed, the force, the distance, and a combination thereof of the stretching bar adjustment with an electronic control unit via the servomotor for each stretching process,
- adjusting the stretching bar during the stretching process by pressurizing the preform from the blast nozzle while taking along the preform bottom to the maximum of contact of the bottom with the mold cavity bottom, and
- reducing the force the servomotor transmits to the stretching bar in a controlled manner with regard to a maximum force one of in a final phase, at the end, or after termination of the stretching process, wherein the force is reduced except for a residual force which is controlled one of with regard to a thermal overload protection of the servomotor, with regard to an off-center protection of the preform bottom, and with regard to a combination thereof.

11. The method according to claim 10, wherein the force is reduced automatically, and wherein one of the force reduction, the waiting time, the period of time, and a combination thereof is automatically calculated and set upon need.

12. The method according to claim 11, wherein the automatic reduction of the force is provided by one of a routine of a control unit and at least one servo converter by means of given servo motor operating parameters.

13. The method according to claim 10, wherein the stretching process is path-controlled during an initial phase and is force-controlled not before the final phase or after termination of the stretching process, and after having switched to the force control, a fixed or variable waiting time is maintained until force reduction takes place.

\* \* \* \* \*